United States Patent
Phillips

(10) Patent No.: US 7,533,826 B2
(45) Date of Patent: May 19, 2009

(54) ELECTRONIC WALLET

(75) Inventor: Simon Phillips, York (GB)

(73) Assignee: Mastercard International, Inc., Purchase, NY (US)

( * ) Notice: Subject to any disclaimer, the term of this patent is extended or adjusted under 35 U.S.C. 154(b) by 169 days.

(21) Appl. No.: 11/674,242

(22) Filed: Feb. 13, 2007

(65) Prior Publication Data

US 2008/0190784 A1    Aug. 14, 2008

(51) Int. Cl.
*G06K 7/00* (2006.01)
*G06K 19/06* (2006.01)

(52) U.S. Cl. .................. 235/486; 235/375; 235/380; 235/382; 235/451; 235/492; 206/39; 206/562; 206/564

(58) Field of Classification Search ........ 235/380–382.5, 235/486, 492, 449, 451; 206/39, 562, 564
See application file for complete search history.

(56) References Cited

U.S. PATENT DOCUMENTS

| | | | |
|---|---|---|---|
| 4,518,080 A | 5/1985 | Ohlson | |
| 4,941,172 A * | 7/1990 | Winebaum et al. | 379/357.03 |
| 5,598,792 A * | 2/1997 | Wales | 109/23 |
| 6,155,410 A * | 12/2000 | Davis | 206/39.5 |
| 6,186,403 B1 * | 2/2001 | Ozbey et al. | 235/487 |
| 7,100,835 B2 | 9/2006 | Selker | |
| 2004/0124248 A1 * | 7/2004 | Selker | 235/492 |
| 2006/0208062 A1 * | 9/2006 | Osborn et al. | 235/380 |

* cited by examiner

*Primary Examiner*—Thien M. Le
*Assistant Examiner*—Tuyen K Vo

(57) ABSTRACT

A case for holding a contactless smart card includes a set of plastic walls for defining a generally planar space. The space may be for housing one smart card or alternatively may be for housing two smart cards. The walls include two parallel walls which each have a planar extent that corresponds to a planar extent of the generally planar space. The two parallel walls include a first wall and a second wall. The first wall has an actuation region formed therein to permit a user's finger to actuate, through the first wall, a switch on the smart card. If the case is for holding two cards, then there is also an actuation region in the second wall. In some embodiments, the case may include additional spaces each for housing one or two cards.

17 Claims, 9 Drawing Sheets

ELECTRONIC WALLET

BACKGROUND

Proximity payment devices are in widespread use. For example, proximity payment cards in the well-known ID-1 standard size incorporate a radio frequency identification (RFID) integrated circuit (IC) and an antenna. In use, the card is presented to a proximity reader that is part of a point of sale (POS) terminal to initiate a payment transaction. The card receives a wireless interrogation signal from the proximity reader via the card antenna. The interrogation signal powers up the RFID IC, which exchanges RF communications with the proximity reader. As part of the communications, the RFID IC provides a payment account number to the POS terminal. The POS terminal uses the payment account number to obtain authorization for the payment transaction.

One well-known standard for proximity payment applications is known as "PayPass" and was promulgated by MasterCard International Incorporated, the assignee hereof.

It has also been proposed that proximity identification devices similar to proximity payment cards may be used for other purposes, such as transit payment/access, travel documents (e.g., "RFID-enabled passports") and/or for other identification purposes. Cards of this kind, including proximity payment cards that incorporate RFID chips, fall under the rubric of "contactless smart cards".

Some holders of payment card accounts may find it convenient to carry a proximity payment device that is smaller than a standard ID-1 card, and issuers of proximity payment cards are moving to issue such smaller devices. For example, U.S. provisional patent application Ser. No. 60/857,009, filed Nov. 6, 2006 (which has a common inventor herewith), discloses contactless smart cards that are conveniently sized to be carried in a fob on a keychain. The smart cards shown therein may be referred to as "subcards" in the sense that they are smaller than ID-1 cards and/or may be detached from a larger carrier. Designs for a fob/case to conveniently carry a subcard are disclosed in U.S. design patent applications 29/268,385 and 29/268,392, both filed Nov. 6, 2006 and both also having a common inventor herewith. Moreover, U.S. patent application Ser. No. 11/585,499, filed Oct. 24, 2006 (also having a common inventor herewith), discloses a mailable kit for conveniently sending both a subcard and a fob/case to the account holder.

It has been proposed (e.g., in U.S. Pat. No. 6,863,220) to include a user-actuated switch in a proximity payment card. The switch may be normally open, and the card may be disabled from entering into a payment transaction except when the switch is actuated. This arrangement may enhance the security of proximity payment cards by preventing unauthorized interrogation of the proximity payment cards.

There have also been proposals for a so-called "universal" smart card; i.e., a single card that stores multiple payment card account numbers, and/or identification numbers for a number of different purposes. Switches or the like may be provided on the card to allow the holder to select the particular function/account/identification information to be uploaded from the card for a particular transaction. However, such proposals have not made much headway in terms of practical applications. Among other issues, it may be a logistical challenge to load data from numerous issuing authorities into a single card, or to update or replace information in the card after it has been sent to the cardholder.

BRIEF DESCRIPTION OF THE DRAWINGS

FIG. 2 is a schematic isometric view showing the carrying case of FIG. 1 with the subcard housed therein.

DETAILED DESCRIPTION

In general, and for the purpose of introducing concepts of embodiments of the present invention, a carrying case for a proximity payment card, such as a subcard, includes an aperture or other feature that allows a switch on the card to be manually actuated while the card is housed within the carrying case. Some embodiments of the carrying case may be suitable for simultaneously housing two, four or eight subcards in such a manner that the user can actuate a switch on any one of the subcards to select the subcard in question for use in a particular transaction. A carrying case of this type may provide many of the benefits sought from the proposed "universal" smart card, while ameliorating difficulties relating to issuance or replacement of cards.

Figure 1:
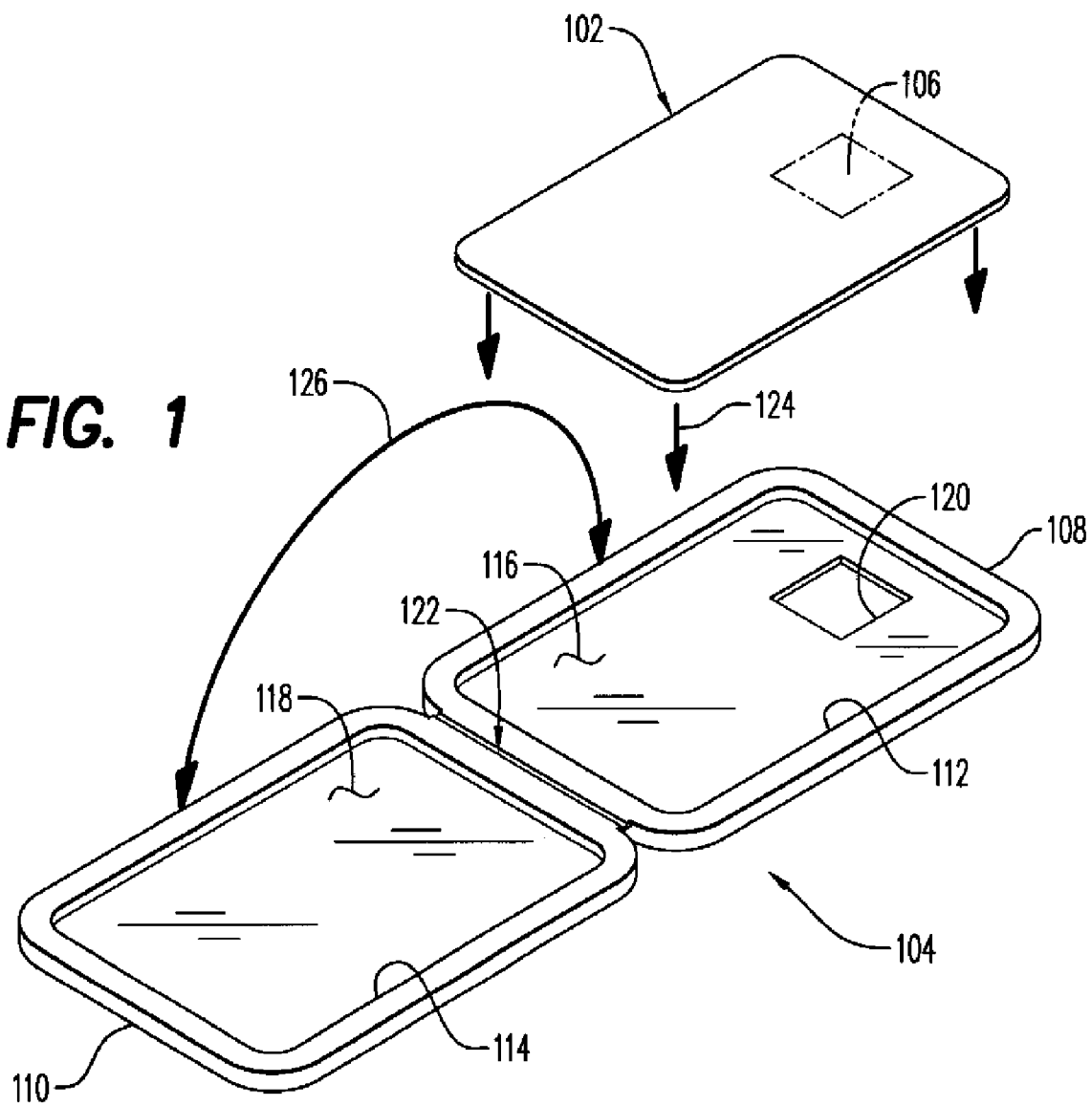
FIG. 1 is a schematic isometric view showing insertion of a subcard into a carrying case in accordance with aspects of the present invention.

FIG. 1 is a schematic isometric view showing insertion of a subcard 102 into a carrying case 104 in accordance with aspects of the present invention.

The subcard 102 may be generally conventional in its construction, except perhaps that the dimensions of the subcard 102 may be somewhat different from any subcard that has previously been proposed. Some details of the subcard 102 will be discussed below. (In some embodiments, the circuit configuration of the subcard 102 may be in accordance with teachings of U.S. patent application Ser. No. 11/517,072, filed Sep. 7, 2006, which is commonly assigned herewith, and which is incorporated herein by reference.) Initially however it will be noted that the subcard is formed from a plastic body, and that the plastic body carries a switch (indicated in phantom at 106) that may be manually actuatable by the card holder to activate the card. The switch 106 may be a pressure sensor, or any device capable of sending a signal to the subcard electronics (to be discussed below) and/or completing or interrupting a circuit on the subcard 102. In some embodiments, the switch 106 may be actuated by squeezing or pressing on the subcard 102 at the locus of the switch 106. It may be assumed that the switch 106 is carried on the front face (not visible in FIG. 1) of the subcard 102 and/or that the switch 106 is actuatable by pressing on the front face of the subcard 102 at the locus of the switch 106.

The case 104 is formed of a front half 108 and a rear half 110. The front half 108 has a recess 112 formed therein generally in the size and shape of the subcard 102, although not necessarily as deep as the subcard is thick. The rear half 110 has a recess 114 formed therein generally in the size and shape of the subcard 102, although not necessarily as deep as the subcard is thick. The recesses 112, 114 are defined by walls that make up the case 104. The recess 112 is defined in part by front wall 116 of the case 104 and the recess 114 is defined in part by rear wall 118 of the case 104. The front wall 116 has an aperture 120 formed therein at a location that corresponds to the locus of the switch 106 on the subcard 102.

The halves 108, 110 may be joined by a living hinge 122 or the like. The subcard may be inserted in, e.g., the recess 112 as indicated by arrow 124 (e.g., with the subcard face down), and then the halves 108, 110 may be pivoted relative to each other as indicated by arrow 126 to close the case 104 around the subcard 102. It will be appreciated that when the case 104 is in its closed condition (seen in FIG. 2) the subcard 102 is housed within the case 104, specifically in a space formed by the recesses 112, 114. The space formed by the recesses 112, 114 is generally planar, and is defined by the front wall 116, the rear wall 118 and side walls of the case 104. When the case 104 is in its closed condition, the walls 116, 118 are substantially parallel to each other and are opposite to each other about the space in which the subcard 102 is housed. It will be appreciated that each of the walls 116, 118 has a planar extent that corresponds to the planar extent of the space formed by the recesses 112, 114, which also substantially corresponds to the planar extent of the subcard 102.

The case 104 may have features that are not explicitly shown. For example, the free ends of the halves 108, 110 may cooperatively form a clasp or catch to hold the case 104 in a closed condition. The clasp or catch may be such as to be easily openable by the user, but such as to be relatively secure when the user is not engaged in opening it. Moreover, one or both of the recesses 112, 114 may have one or more fingers or tabs extending inwardly from the edges thereof to retain the subcard 102 in the recess after insertion therein of the subcard and while the case is being closed.

With the case 104 closed around the subcard 102, the aperture 120 is positioned to allow the user's finger to actuate the switch 106 (FIG. 1; not shown in FIG. 2) on the subcard 102 to activate the subcard 102. The aperture may be suitably sized both to allow actuation of the switch and to guide the user to the location of the switch. For example, the aperture may be round or square or in another shape and may take up about 100 mm$^2$ of the area of the wall in which it is formed.

The area of the aperture may thus be on the order of about 10%, 15% or 20% of the area of the wall in which it is formed.

Figure 3:
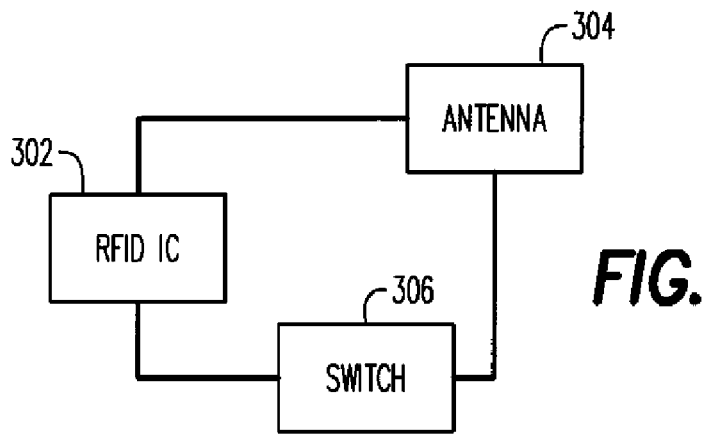
FIGS. 3-5 are simplified block diagram representations of alternative circuit configurations that may be employed in the subcard of FIGS. 1 and 2.
Figure 4:
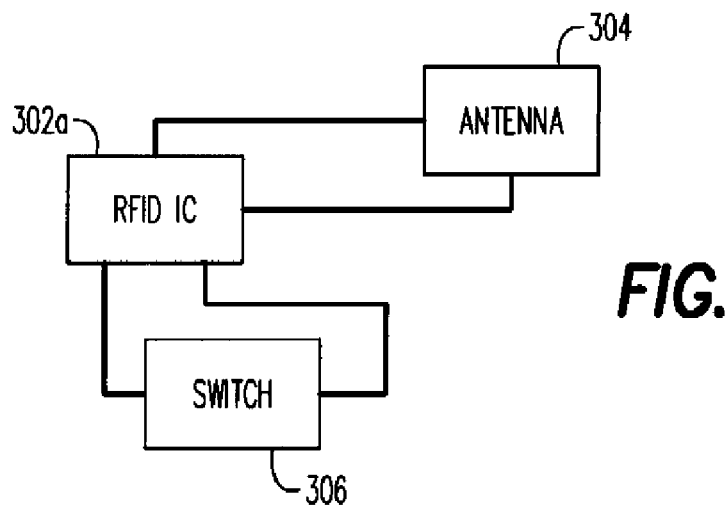
Figure 5:
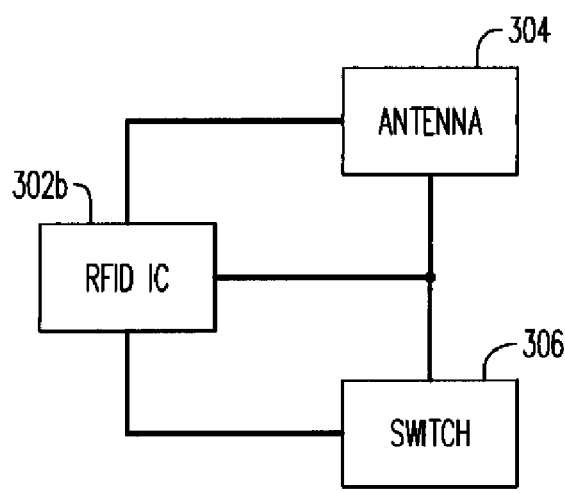

FIGS. 3-5 show alternative configurations of electronic and/or electrical components and circuitry of the subcard 102. All of the components/circuitry shown in one or more of FIGS. 3-5 may be embedded in and/or supported by a card-shaped plastic body (not separately shown) that defines the physical dimensions of the subcard 102.

Referring now to FIG. 3, the subcard 102 may include a conventional radio frequency identification (RFID) integrated circuit (IC) 302. The RFID IC 302 may store a payment account number and/or other information that identifies the holder of the subcard 102. The subcard 102 may further include an antenna 304 and a switch 306 to selectively complete the circuit between the antenna 304 and the RFID IC 302. When the switch 306 is actuated to complete the circuit, the RFID IC 302 is coupled to the antenna 304 so as to allow the RFID IC 302 to receive an interrogation/power signal via the antenna 304 and/or to respond to an interrogation signal by transmitting a payment account number and/or other identifying information. When the switch 306 is unactuated (open), the subcard 102 is disabled from being successfully interrogated.

Referring now to FIG. 4, in this circuit configuration, the RFID IC 302a is always coupled to the antenna 304, but is enabled to receive and/or respond to an interrogation signal only when the switch 306 is actuated to send an enable signal to the RFID IC 302a.

FIG. 5 is a variation on the configuration of FIG. 4. In the configuration of FIG. 5, the RFID IC 302b is always coupled to the antenna 304, and may receive an enable signal in response to actuation of the switch 306, but the switch 306 shares a terminal with the antenna 304.

Other alternative configurations may reflect teachings of the above-referenced patent application Ser. No. 11/517,072.

Figure 6:
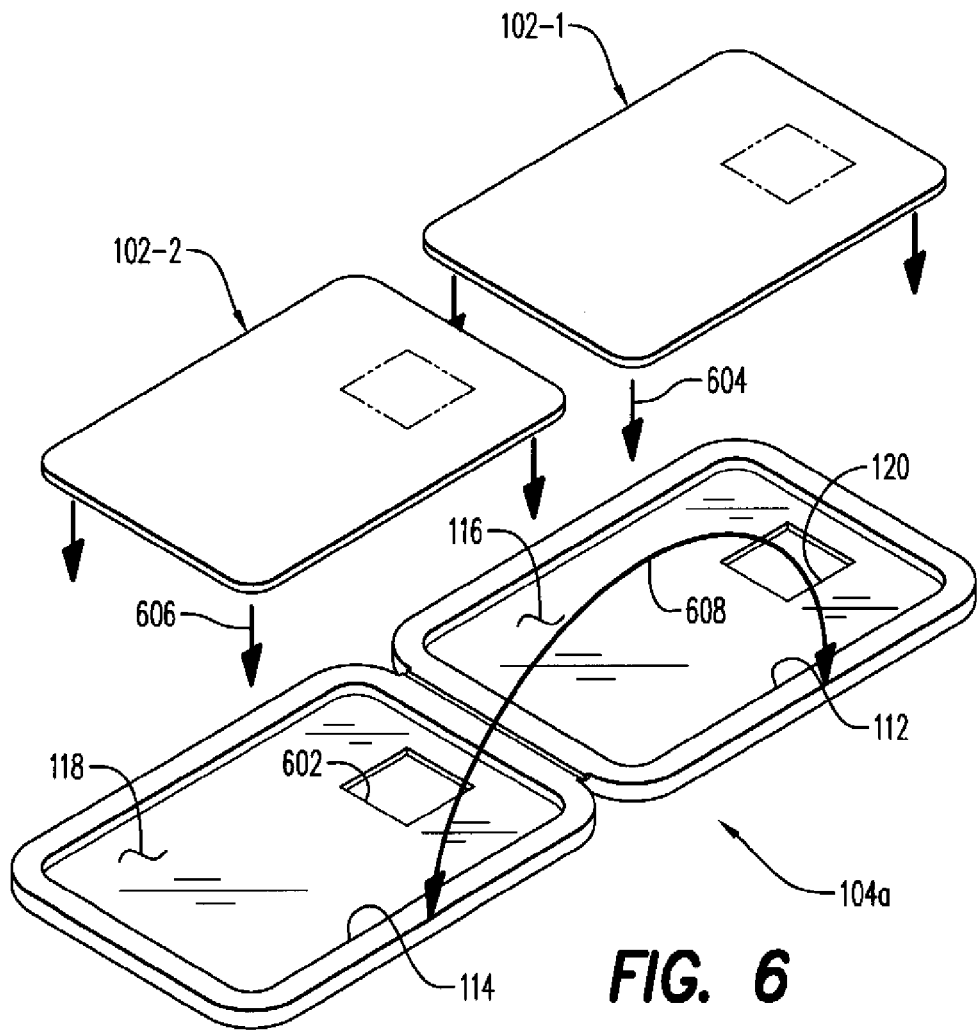
FIG. 6 is a schematic isometric view showing insertion of two subcards into a carrying case in accordance with other aspects of the present invention.

FIG. 6 is a schematic isometric view showing insertion of two subcards 102-1, 102-2 into a carrying case 104a in accordance with other aspects of the present invention.

Each of the subcards 102-1, 102-2 may be like the subcard 102 described above in terms of structure and function, except that, for example, the two subcards may provide access to different payment accounts, or one of the subcards may be a proximity payment card, while the other may identify the holder for some other purpose.

Figure 8:
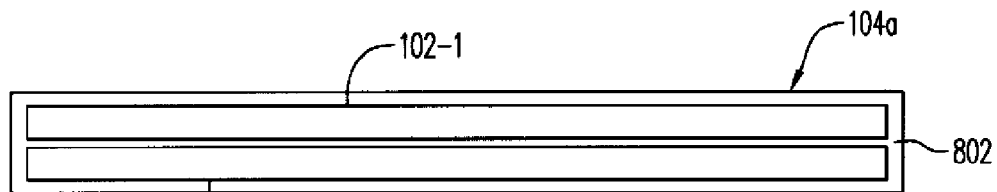
FIG. 8 is a schematic sectional view of the carrying case of FIGS. 6 and 7 showing the subcards housed therein.

The case 104a may be similar in structure to the above-described case 104, except possibly that one or both of the recesses 112, 114 may be increased in depth such that the space (802 in FIG. 8) formed by the recesses when the case is in its closed condition may be deep enough to simultaneously hold the two subcards 102-1, 102-2, as seen in FIG. 8. Moreover, in addition to the aperture 120 in front wall 116, there is also an aperture 602 formed in rear wall 118. The aperture 602 is located in rear wall 118 so as to correspond to the locus of the switch (not shown) in the subcard 102-2.

Figure 7:
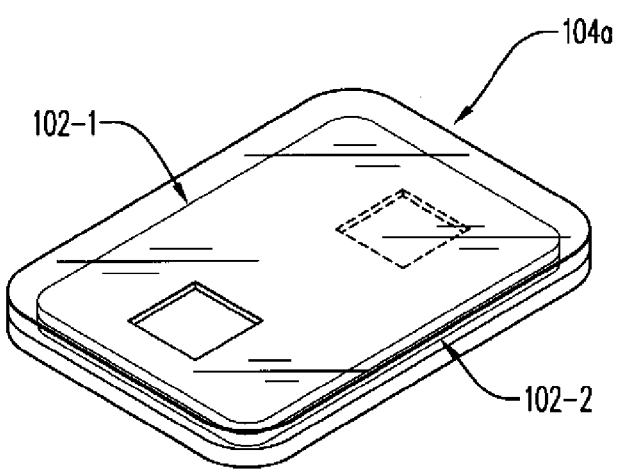
FIG. 7 is a schematic isometric view showing the carrying case of FIG. 6 with the subcards housed therein.

As indicated by arrows 604, 606, the subcards 102-1, 102-2 may be inserted face down in the recesses 112, 114, respectively. Then the halves of the case 104a may be pivoted relative to each other as indicated by arrow 608 to close the case 104a around the subcards 102-1, 102-2. With the case closed, as seen in FIGS. 7 and 8, the subcards 102-1, 102-2 are housed back-to-back in the space 802 (FIG. 8) formed by the recesses 112, 114.

The user is now permitted to select between the two subcards (i.e., to select which card to use for a particular transaction or other activity) by either actuating the switch on subcard 102-1 by pressing the subcard 102-1 through the aperture 120 in the front wall 116 of the case or by actuating the switch on subcard 102-2 by pressing the subcard 102-2 through the aperture 602 in the rear wall 118. Preferably the case is transparent, with or without tinting (e.g., the case may be formed of substantially rigid molded plastic), to allow the user to see the faces of the subcard while they are inside the case to aid the user in selecting which subcard to use for the transaction/activity. The pressing of one of the subcards to select the subcard may occur while the case is presented to a proximity reader (e.g., the case is placed in proximity to and/or tapped on the proximity reader).

Figure 9:
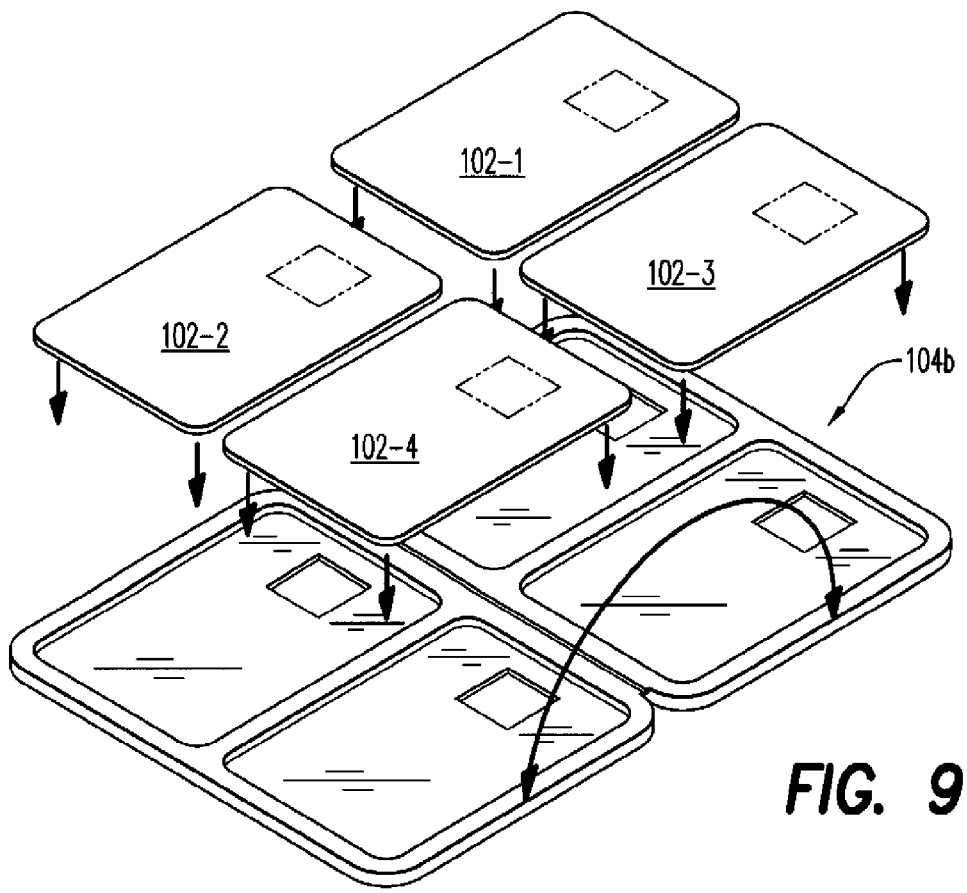
FIG. 9 is a schematic isometric view showing insertion of four subcards into a carrying case in accordance with other aspects of the present invention.

FIG. 9 is a schematic isometric view showing insertion of four subcards 102-1, 102-2, 102-3, 102-4 into a carrying case 104b in accordance with other aspects of the present invention. The case 104b differs from the case 104a of FIGS. 6-7 in that in the case 104b each half of the case has two recesses therein, to form two card-housing spaces when the case is closed. Each card-housing space is sized to hold two subcards back-to-back. Both card-housing spaces are in a common plane. The front wall of the case has two apertures therein and the rear wall also has two apertures therein. Each of the four apertures is positioned to give access for the user's finger to the switch of a respective one of the four subcards housed in the case.

Figure 10:
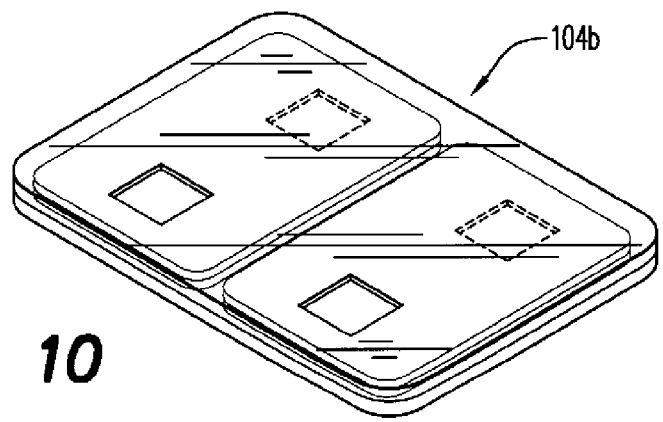
FIG. 10 is a schematic isometric view showing the carrying case of FIG. 9 with the subcards housed therein.
Figure 11:
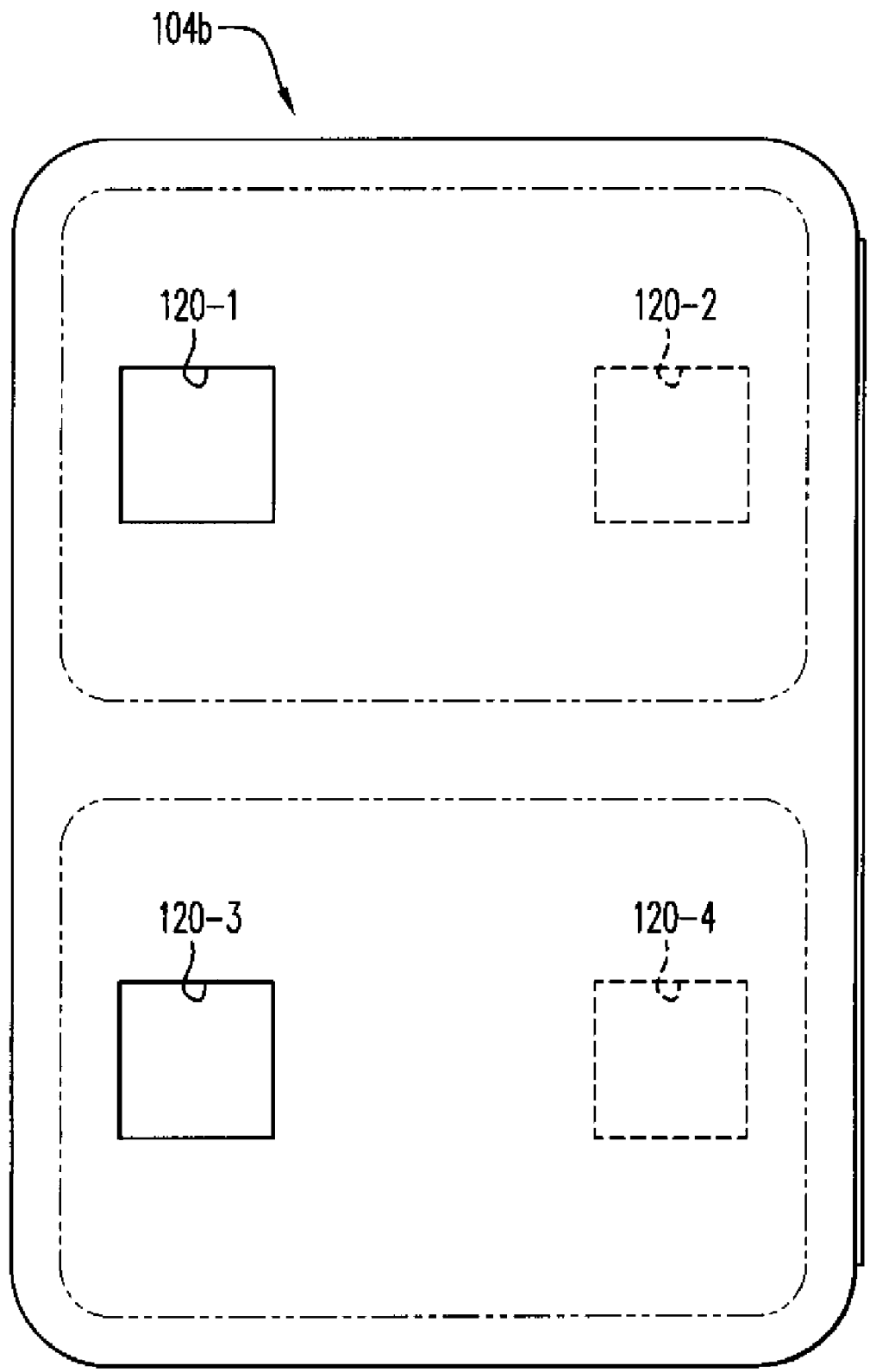
FIG. 11 is a schematic plan view of the carrying case of FIGS. 9 and 10.

FIG. 10 shows the case 104b in its closed condition with subcards housed inside the case 104b. FIG. 11 is a plan view of the closed case, showing the loci of the four apertures 120-1 (front wall), 120-2 (front wall), 120-3 (rear wall) and 120-4 (rear wall). It will be noted that the four apertures are all offset from each other in one or more directions parallel to the plane of the card-housing spaces. With this arrangement, it is fairly well assured that when the user activates one of the subcards in the case, he/she will not simultaneously activate any other of the subcards.

The subcards shown in FIG. 9 may be like those described above in connection with FIGS. 1-8.

As in the example of the two-card case 104a, the user may select among the four subcards housed in the case 104b by actuating a switch on the particular subcard to be selected. The case provides a convenient card-shaped holder in which up to four subcards may be carried, and any one of the four may be selected for use in a given transaction by presenting the case to the proximity reader and activating the selected card by actuating its switch.

Figure 12:
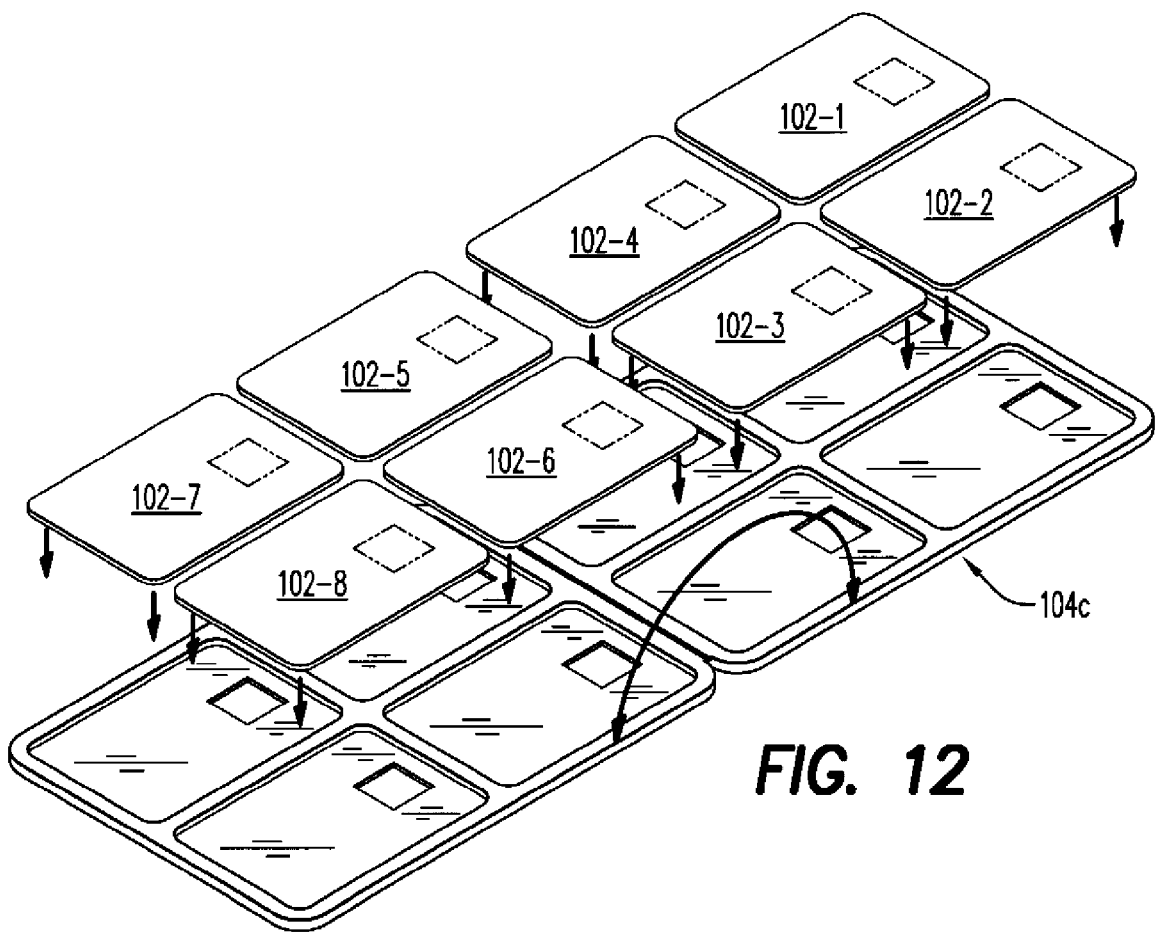
FIG. 12 is a schematic isometric view showing insertion of eight subcards into a carrying case in accordance with other aspects of the present invention.

FIG. 12 is a schematic isometric view showing insertion of eight subcards 102-1, 102-2, 102-3, 102-4, 102-5, 102-6, 102-7, 102-8 into a carrying case 104c in accordance with other aspects of the present invention. The case 104c differs from cases 104a, 104b in that in the case 104c each half of the case has four recesses therein, to form four card-housing spaces when the case is closed. Each card-housing space is sized to hold two subcards back-to-back. All four card-housing spaces are in a common plane. The card-housing spaces are arranged as a two-by-two array in the common plane. The front wall of the case has four apertures therein and the rear wall also has four apertures therein. Each of the eight apertures is positioned to give access for the user's finger to the switch of a respective one of the eight subcards housed in the case.

Figure 13:
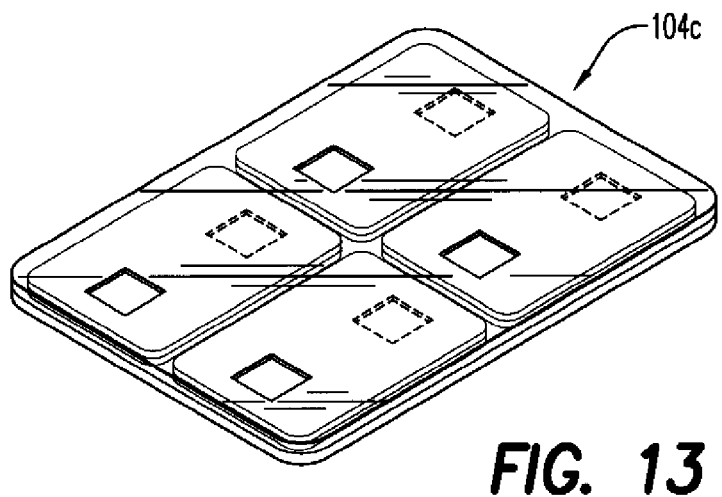
FIG. 13 is a schematic isometric view showing the carrying case of FIG. 12 with the subcards housed therein.
Figure 14:
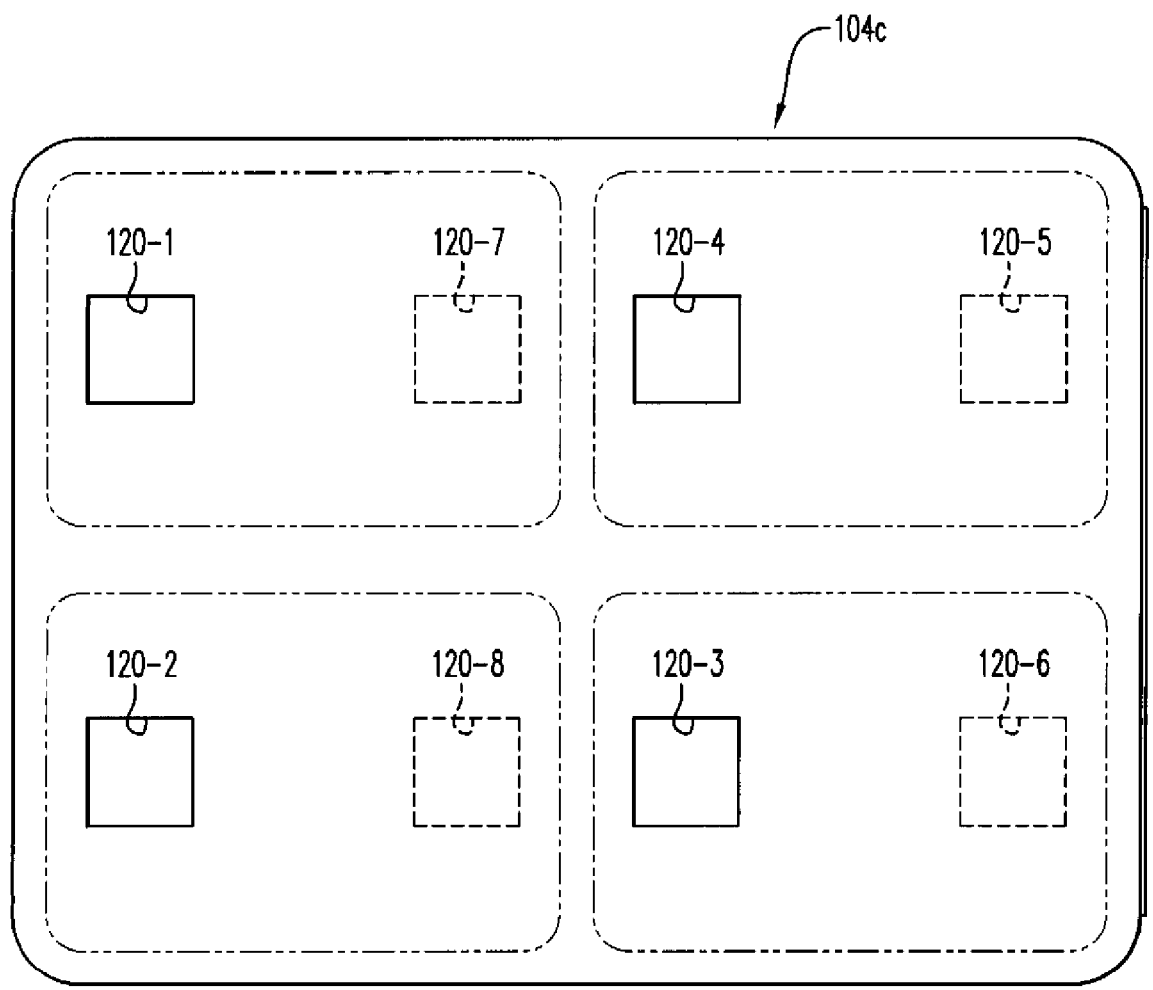
FIG. 14 is a schematic plan view of the carrying case of FIGS. 12 and 13.

FIG. 13 shows the case 104c in its closed condition with subcards housed inside the case 104c. FIG. 14 is a plan view of the closed case, showing the loci of the eight apertures 120-1 (front wall), 120-2 (front wall), 120-3 (front wall), 120-4 (front wall), 120-5 (rear wall), 120-6 (rear wall), 120-7 (rear wall) and 120-8 (rear wall). As in the case 104b, all of the apertures in the case 104c are offset from each other in one or more directions parallel to the plane of the card-housing spaces. As noted above regarding the case 104b, the offsets among the apertures helps to assure that only one subcard is activated at a time.

The case 104c may (when closed) have overall dimensions similar to the standard ID-1 card (i.e., about 54 mm high by 86 mm wide) but may be thicker than the standard ID-1 card, say four to six times thicker. Correspondingly, each subcard may have about one-quarter of the surface area of the standard ID-1 card, and thus may be about 27 mm high by 43 mm wide. All of the subcards discussed herein may be of this size, and the other cases 104b, 104a, 104 may be sized accordingly. Thus the case 104b may be about half the size of the case 104c in terms of planar extent, and the cases 104a, 104 may be about one-quarter of the size of the case 104c in terms of planar extent. Alternatively, the subcards may be of any convenient size, including but not limited to any size less than the standard ID-1 card, and the cases may be sized to match the subcards.

In some embodiments, the subcards may be suitably sized as keychain fobs and the case may include an opening to receive a keychain and may otherwise be arranged like a fob to hold one or two subcards, but with one or two apertures to permit the user to actuate the (respective) switch of the subcard(s).

It may be said that the apertures referred to in connection with FIGS. 1-14 or otherwise herein constitute "actuation regions" of the carrying cases in that the apertures permit actuation, by a user's finger, of a switch on a subcard carried in the case.

Figure 15:
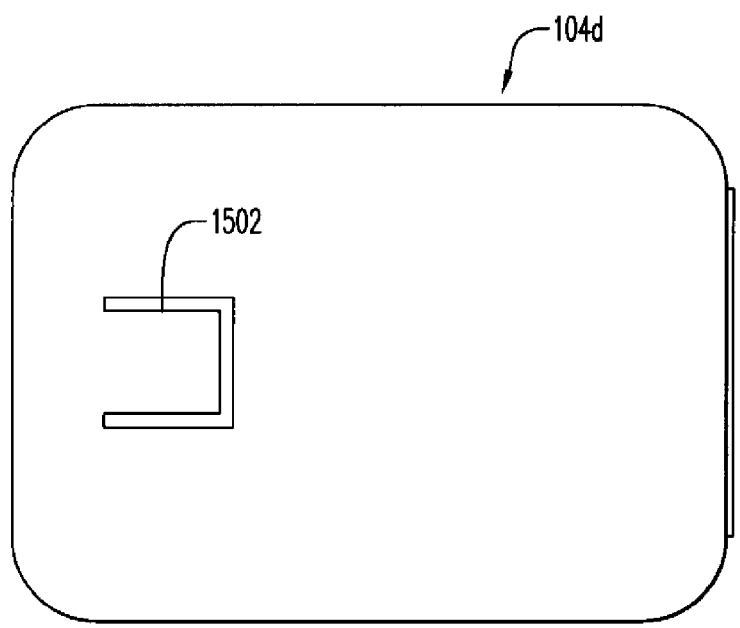
FIG. 15 is a schematic view of a subcard carrying case, showing an alternative arrangement, according to aspects of the invention, for allowing actuation of a subcard that is housed within the carrying case.
Figure 16:
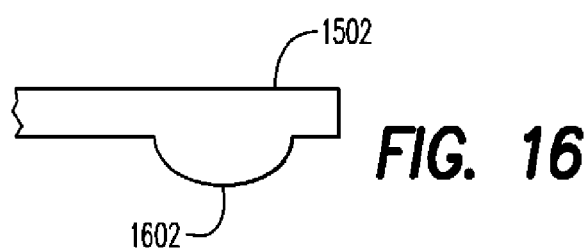
FIG. 16 is a sectional view of a portion of the actuation arrangement of FIG. 15.
Figure 17:
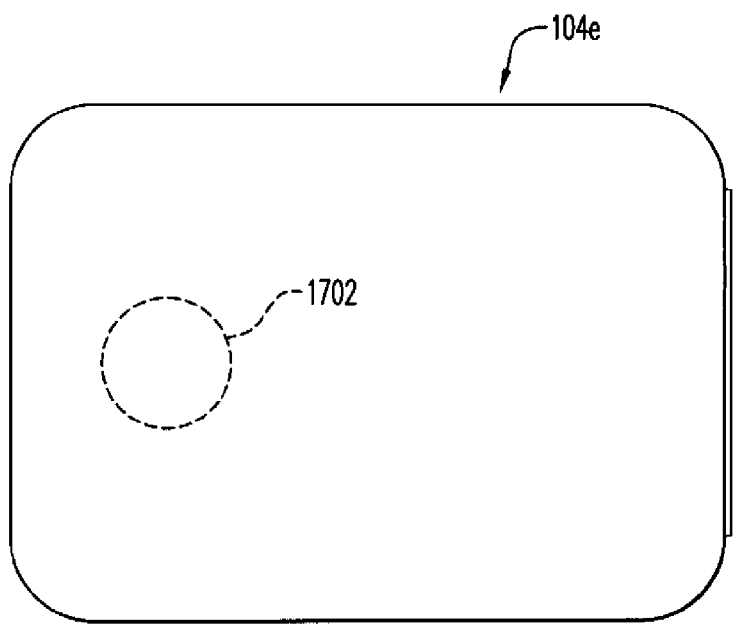
FIG. 17 is a schematic view of a subcard carrying case, showing another alternative arrangement for allowing actuation of a subcard that is housed within the carrying case.

However, other forms of actuation region may be provided in alternative embodiments of the invention. For example, as seen from FIG. 15 one or more or all of the apertures may each respectively be replaced by a flap 1502 integrally formed in the corresponding wall of the carrying case. The flap 1502 may have a button 1602 (FIG. 16) formed on an underside of the flap 1502. Upon being pressed by a user's finger, the flap 1502 may deflect inwardly relative to the corresponding wall of the carrying case so that the button 1602 contacts and actuates the switch (not shown in FIGS. 15, 16) of the subcard (not shown in FIGS. 15, 16) lying beneath the corresponding wall of the carrying case. Alternatively, the actuation region may be formed as a dimple 1702 (FIG. 1702) or another area of reduced thickness and/or increased flexibility and/or contrasting material composition relative to the balance of the wall of the carrying case, the nature of the actuation region 1702 being such that it may be pressed inwardly, by the user's finger, relative to the wall to permit the user's finger to actuate the switch (not shown in FIG. 17) on the subcard (not shown in FIG. 17) inside the carrying case and beneath the wall of the case which includes the actuation region 1702. An actuation region of the type described in the previous sentence may be referred to as a "depressable button".

Figure 18:
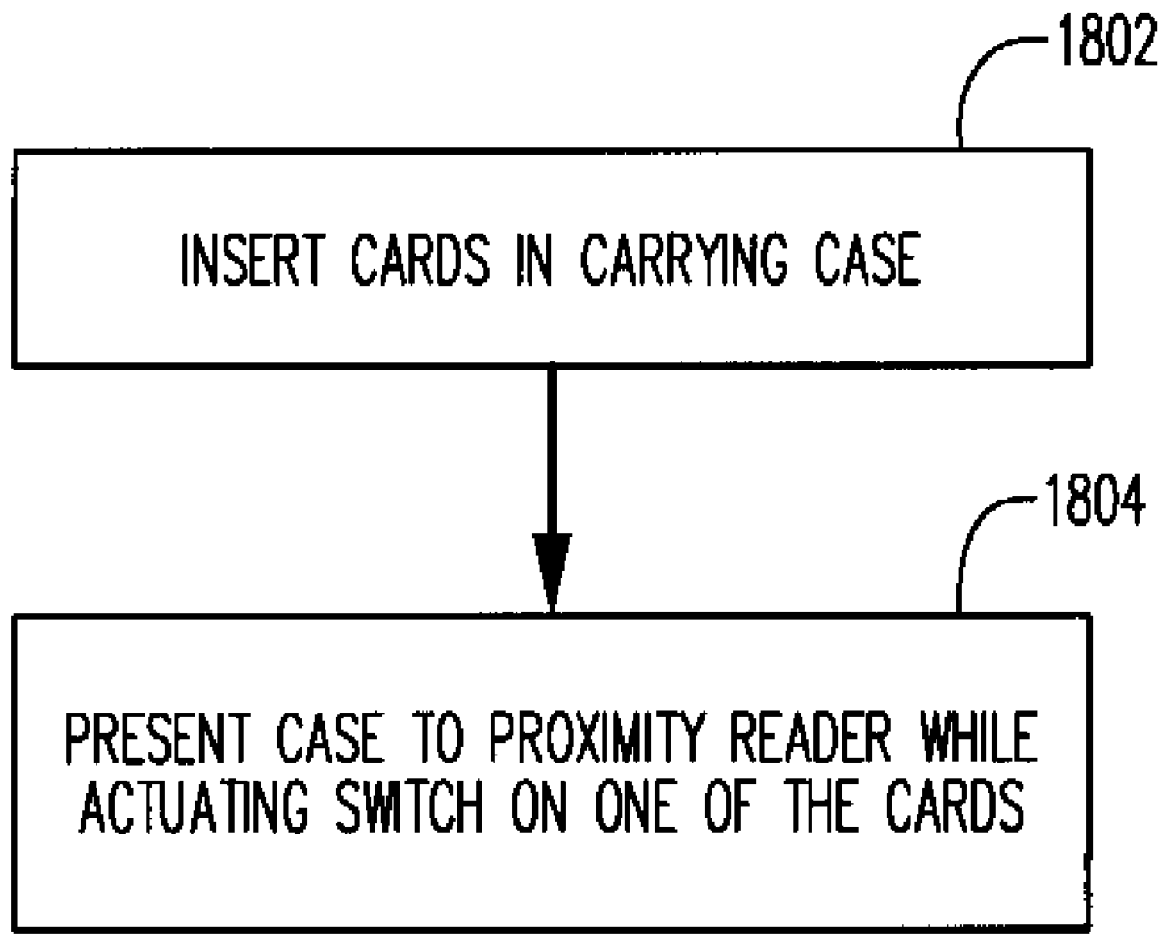
FIG. 18 is a flow chart that illustrates a process that may be performed according to aspects of the present invention.

FIG. 18 is a flow chart that illustrates a process that may be performed according to aspects of the present invention.

At 1802, the user inserts two or more subcards into a carrying case 104a, 104b or 104c. At 1804, the user presents the case (with the subcards housed therein) to a proximity reader for use in a payment transaction or another activity that requires interrogation and reading of one of the subcards. The user may present the case to the proximity reader by tapping the case on a designated part of the reader or by otherwise bringing the case into proximity with the reader. While doing so, the user uses his/her finger to actuate a switch on one of the subcards to activate that subcard and to thereby select that subcard for reading by the reader and use in the transaction/activity.

According to certain aspects of the invention, a carrying case such as one of those described herein is shipped to a prospective cardholder as part of a kit which also includes a subcard appointed for use by the prospective cardholder. The cardholder may in effect assemble the kit by inserting the subcard (and perhaps other subcards as well) in the carrying case.

In an alternative embodiment of the carrying case(s), an end of the case includes a slot to allow for insertion lengthwise of one or more subcards into the card-housing spaces. In such embodiments, the case is always closed, and does not include two mutually pivotable halves.

Particularly with the multi-card carrying cases, a single carrier embodies multi-application functionality, without requiring that a single card be transported among and/or accessed by several different card issuers. That is, with this arrangement, issuers for different cards or types of cards each issue a respective subcard to the user, who then inserts the subcards in the carrying case to assemble the multi-application carrier. By the same token, subcards may be replaced or reissued one-by-one. The applications collectively provided by the subcards in the same carrier may include payment (e.g., for plural payment card accounts), customer loyalty, access control, medical records/identification, passport and/or transit.

This arrangement also takes advantage of the proposal to include "on" switches in contactless cards by using the existence of such switches to solve what would otherwise be an issue of contention and/or selection if a number of "always on" cards were simultaneously presented to a reader. This is a novel application for the "on" switch, which was originally proposed as a way of enhancing the security of contactless cards.

As used herein and in the appended claims, a "contactless smart card" refers to a proximity payment card or other smart card that can be read by radio signals, even if also equipped with contacts.

Each of the card-housing spaces referred to herein may also be referred to as a "chamber".

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A case for holding a contactless smart card, the case comprising a set of plastic walls for defining a generally planar space for housing the smart card, the walls including two parallel walls each having a planar extent that corresponds to a planar extent of the generally planar space, the two parallel walls including a first wall and a second wall, the first wall having an actuation region formed therein, the actuation region for permitting a user's finger to actuate, through the first wall, a switch on the smart card, wherein the actuation region includes an aperture formed in the first wall, said aperture shaped and sized to allow a tip of the user's finger to pass through the first wall, said aperture occupying not more than substantially 100 mm$^2$ of area of said first wall.

2. The case of claim 1, wherein:
the generally planar space is deep enough to accommodate two smart cards housed back-to-back in the space;
and the case further comprising an actuation region formed in the second wall, the actuation region formed in the second wall for permitting the user's finger to actuate, through the second wall, a switch on a second smart card, the actuation region in the second wall offset from the actuation region in the first wall in a direction parallel to the planar direction of the generally planar space.

3. The case of claim 2, wherein the case defines two generally planar spaces for each holding two smart cards back-to-back, each of the two walls having a pair of actuation regions formed therein, each of the actuation regions for permitting the user's finger to actuate, through a respective one of the walls, a switch on a respective one of the smart cards, each of the actuation regions offset from each of the other actuation regions in at least one direction parallel to a planar extent of the generally planar spaces.

4. The case of claim 3, wherein the case defines four generally planar spaces for each holding two smart cards back-to-back, each of the two walls having four actuation regions formed therein, each of the actuation regions for permitting the user's finger to actuate, through a respective one of the walls, a switch on a respective one of the smart cards, each of the actuation regions offset from each of the other actuation regions in at least one direction parallel to a planar extent of the generally planar spaces.

5. The case of claim 1, formed substantially of rigid plastic.

6. A case for holding a contactless smart card, the case comprising a set of plastic walls for defining a generally planar space for housing the smart card, the walls including two parallel walls each having a planar extent that corresponds to a planar extent of the generally planar space, the two parallel walls including a first wall and a second wall, the first wall having an actuation region formed therein, the actuation region for permitting a user's finger to actuate, through the first wall, a switch on the smart card;
wherein the actuation region includes a depressable flap.

7. The case of claim 6, wherein the flap has a button formed on an inside surface of the flap.

8. A case for holding a contactless smart card, the case comprising a set of plastic walls for defining a generally planar space for housing the smart card, the walls including two parallel walls each having a planar extent that corresponds to a planar extent of the generally planar space, the two parallel walls including a first wall and a second wall, the first wall having an actuation region formed therein, the actuation region for permitting a user's finger to actuate, through the first wall, a switch on the smart card;
wherein the actuation region includes a depressable button formed in the first wall.

9. A smart card assembly, comprising:
a smart card that includes a user-actuatable switch; and
a case in which the smart card is housed, the case including an actuation region adjacent the switch, the actuation region for permitting a user's finger to actuate the switch at a time when the smart card is inside the case;
wherein the actuation region is one of:
(a) an aperture formed in the wall of the case, said aperture occupying not more than substantially 100 mm$^2$ of area of said wall;
(b) a flap formed in the wall of the case; and
(c) a depressable button formed in the wall of the case.

10. The smart card assembly of claim 9, wherein:
the smart card is a first smart card; and
the actuation region is a first actuation region;
the assembly further comprising:
a second smart card, the second smart card including a user-actuatable switch, the first and second smart cards housed back-to-back in a chamber formed by the case, the case including a second actuation region adjacent the user-actuatable switch of the second smart card, the second actuation region for permitting the user's finger to actuate the switch of the second smart card at a time when the second smart card is inside the case, the first actuation region formed in a first wall of the case, the second actuation region formed in a second wall of the case that is opposite the first wall.

11. The smart card assembly of claim 10, wherein:
the chamber is a first chamber;
the case also forming a second chamber in a common plane with the first chamber;
the assembly further comprising:
a third smart card; and
a fourth smart card;
the third and fourth smart cards housed back-to-back in the second chamber, the third smart card including a respective user-actuatable switch, the fourth smart card including a respective user-actuatable switch, the case including a third actuation region and a fourth actuation region, the third actuation region formed in the first wall adjacent the switch of the third smart card, the third actuation region for permitting the user's finger to actuate the switch of the third smart card at a time when the third smart card is inside the case, the fourth actuation region formed in the second wall adjacent the switch of the fourth smart card, the fourth actuation region for permitting the user's finger to actuate the switch of the fourth smart card at a time when the fourth smart card is inside the case.

12. The smart card assembly of claim 11, wherein the case also forms a third chamber and a fourth chamber, all of the first, second, third and fourth chambers in said common plane;
the assembly further comprising:
a fifth smart card;
a sixth smart card;
a seventh smart card; and
an eighth smart card;
the fifth and sixth smart cards housed back-to-back in the third chamber, the seventh and eighth smart cards housed back-to-back in the fourth chamber, the fifth smart card including a respective user-actuatable switch, the sixth smart card including a respective user-actuatable switch, the seventh smart card including a respective user-actuatable switch, the eighth smart card including a respective user-actuatable switch, the case including a fifth actuation region, a sixth actuation region, a seventh actuation region and an eighth actuation region, the fifth actuation region formed in the first wall adjacent the switch of the fifth smart card, the fifth actuation region for permitting the user's finger to actuate the switch of the fifth smart card at a time when the fifth smart card is inside the case, the sixth actuation region formed in the second wall adjacent the switch of the sixth smart card, the sixth actuation region for permitting the user's finger to actuate the switch of the sixth smart card at a time when the sixth smart card is inside the case, the seventh actuation region formed in the first wall adjacent the switch of the seventh smart card, the seventh actuation region for permitting the user's finger to actuate the switch of the seventh smart card at a time when the seventh smart card is inside the case, the eighth actuation region formed in the second wall adjacent the switch of the eighth smart card, the eighth actuation region for permitting the user's finger to actuate the switch of the eighth smart card at a time when the eighth smart card is inside the case.

13. The smart card assembly of claim 12, wherein each of the smart cards has a total surface area that is substantially equal to one-fourth of a total surface area of an ID-1 card.

14. A kit comprising:
a smart card; and
a carrying case for housing the smart card;
the smart card including a user-actuatable switch, the carrying case including at least one wall that includes an actuation region formed in the wall, the actuation region located in the wall so as to be adjacent to the user-actuatable switch upon the smart card having been inserted in the carrying case, the actuation region for permitting a user's finger to actuate the switch when the smart card is in the carrying case;
wherein the actuation region is one of:
(a) an aperture formed in the wall of the case, said aperture occupying not more than substantially 100 mm$^2$ of area of said wall;
(b) a flap formed in the wall of the case; and
(c) a depressable button formed in the wall of the case.

15. A method comprising:
receiving a kit that includes a carrying case and a first card, the first card including a radio frequency identification (RFID) integrated circuit (IC) and a switch for actuating operation of the RFID IC, the carrying case including an actuation region located in a position in a wall of the carrying case, said position of said actuation region corresponding to a locus of the switch on the first card;
storing a plurality of cards in said carrying case; each of said cards including a respective RFID IC, said plurality of cards including said first card; and
presenting the case to a proximity reader while using a finger to actuate a switch on one of the cards to select said one of said cards for reading by the reader, said cards inside the case while the switch is being actuated.

16. The method of claim 15, wherein the plurality of cards includes four cards.

17. The method of claim 16, wherein the plurality of cards includes eight cards.

* * * * *

UNITED STATES PATENT AND TRADEMARK OFFICE
CERTIFICATE OF CORRECTION

PATENT NO. : 7,533,826 B2  Page 1 of 1
APPLICATION NO. : 11/674242
DATED : May 19, 2009
INVENTOR(S) : Simon Phillips It is certified that error appears in the above-identified patent and that said Letters Patent is hereby corrected as shown below:

Title Page
Please add Attorney, Agent, or Firm to the Letters Patent as follows:

(74) Attorney, Agent, or Firm – Buckley, Maschoff & Talwalkar LLC

Signed and Sealed this

Thirtieth Day of June, 2009

JOHN DOLL
*Acting Director of the United States Patent and Trademark Office*